US007706834B2

(12) United States Patent
Kim et al.

(10) Patent No.: US 7,706,834 B2
(45) Date of Patent: Apr. 27, 2010

(54) MOBILE TERMINAL HAVING RADIO FREQUENCY IDENTIFICATION (RFID) FUNCTION

(75) Inventors: Yong-jin Kim, Seoul (KR); Young-eil Kim, Suwon-si (KR); Seong-soo Lee, Suwon-si (KR); Byung-tae Yoon, Suwon-si (KR); Kang-wook Kim, Mokpo-si (KR); Se-hyun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 281 days.

(21) Appl. No.: 11/500,407

(22) Filed: Aug. 8, 2006

(65) Prior Publication Data

US 2007/0135083 A1 Jun. 14, 2007

(30) Foreign Application Priority Data

Dec. 9, 2005 (KR) ..................... 10-2005-0120707

(51) Int. Cl.
*H04M 1/00* (2006.01)

(52) U.S. Cl. ..................... 455/552.1; 455/41.2; 455/78; 455/121; 340/10.1; 340/572.1

(58) Field of Classification Search ............. 455/550.1, 455/41.2, 78, 83, 405, 344, 120, 121, 276, 455/286, 290, 306, 307, 552.1
See application file for complete search history.

(56) References Cited

U.S. PATENT DOCUMENTS

| | | | | |
|---|---|---|---|---|
| 7,148,751 | B2 * | 12/2006 | Weigand et al. | 330/307 |
| 2004/0075491 | A1 * | 4/2004 | Kushitani et al. | 330/51 |
| 2005/0037800 | A1 * | 2/2005 | Shih | 455/550.1 |
| 2005/0221855 | A1 * | 10/2005 | Kuriyama et al. | 455/553.1 |
| 2007/0141997 | A1 * | 6/2007 | Wulff et al. | 455/78 |

FOREIGN PATENT DOCUMENTS

| | | | |
|---|---|---|---|
| CN | 1937427 | A | 3/2007 |
| EP | 1439487 | A2 | 7/2004 |
| EP | 1523158 | A1 | 4/2005 |
| GB | 2358991 | A | 8/2001 |

* cited by examiner

*Primary Examiner*—Nick Corsaro
*Assistant Examiner*—Chuong A Ngo
(74) *Attorney, Agent, or Firm*—Sughrue Mion, PLLC

(57) ABSTRACT

A mobile terminal is provided having an radio frequency identification (RFID) function and includes an antenna which transmits and receives a radio signal; a radio frequency identification matching circuit which changes an operating band of the antenna to a frequency band where an RFID radio signal is input and output; a communication module which processes a mobile communication radio signal transmitted and received via the antenna; and a switch which connects the antenna to either the communication module or the RFID matching circuit according to whether an RFID function is used or not. Accordingly, the compactness of the mobile terminal can be realized, and the RFID communication performance can be enhanced.

13 Claims, 3 Drawing Sheets

MOBILE TERMINAL HAVING RADIO FREQUENCY IDENTIFICATION (RFID) FUNCTION

CROSS-REFERENCE TO RELATED APPLICATIONS

This application claims priority under 35 U.S.C. § 119 (a) from Korean Patent Application No. 10-2005-0120707 filed on Dec. 9, 2005 in the Korean Intellectual Property Office, the entire disclosure of which is incorporated herein by reference.

BACKGROUND OF THE INVENTION

1. Field of the Invention

Methods and apparatuses consistent with the present invention relate to a mobile terminal having a radio frequency identification (RFID) function. More particularly, the present invention relates to a mobile terminal having an RFID function which processes both a radio signal for RFID and a radio signal for mobile communications that are transmitted and received via a single antenna in order to miniaturize the mobile terminal without having to add an antenna for the RFID to the mobile terminal.

2. Description of the Related Art

Recently, an area of increasing interest in information technology is an idea of having a ubiquitous sensor network (USN) as a basic infrastructure for realizing a ubiquitous technology-based society.

The USN is a technique of attaching an electronic tag having a communication ability to all objects, sense environmental information of the surrounding based on the information relating to the identified objects which is acquired through the electronic tags, and manage and utilize the sensed information over networks in real-time. The core of the USN is a radio frequency identification (RFID) system. The RFID system is constructed using a reader, an antenna, an electronic tag, a server, and a network. The reader serves to read or store information from the electronic tag. The antenna is used to exchange data stored in the electronic tag at a predefined frequency in conformity with a prescribed protocol.

The convergence of the RFID system and the mobile communications leads to the development of the new technique and services called a mobile RFID (mRFID). In the mRFID, an electronic tag, a reader, an antenna, and a processing module are attached to a mobile terminal so as to read out information from other electronic tags and provide useful information services to a user, or to transmit information from the mobile terminal to other devices via the electronic tag of the mobile terminal.

The RFID antenna used for the mRFID transmits and receives the radio signal in the band ranging from 908.5 MHz to 914 MHz, whereas the antenna used for communications of the mobile terminal transmits and receives the radio signal in the band of 800 MHz. As one can see, the band of the RFID radio signal is not far different from the band of the mobile communication radio signal. Yet, in case that the mobile communication antenna of a related art mobile terminal adopts the narrow band, it is hard to transmit and receive the RFID radio signal. Thus, for the implementation of the mRFID technique, the related art mobile terminal is typically equipped with the RFID antenna and the mobile communication antenna, separately.

However, when the RFID antenna and the mobile communication antenna are provided respectively, the mobile terminal is prone to size enlargement. This size enlargement is contrary to the ongoing development of the mobile terminal toward the compactness of the mobile terminal through miniaturizing and integrating the mobile communication antenna.

In this regard, it is possible to avoid the size enlargement of the mobile terminal due to a plurality of antennas, by transmitting and receiving both the RFID radio signal and the mobile communication radio signal via a single antenna.

SUMMARY OF THE INVENTION

An aspect of the present invention is to provide a mobile terminal having an RFID function which processes both an RFID radio signal and a mobile communication radio signal that are transmitted and received via a single antenna, and thus miniaturize the mobile terminal.

In accordance with the aspect of the present invention, a mobile terminal includes an antenna disposed at one side of the mobile terminal, the antenna which transmits and receives a radio signal; a radio frequency identification (RFID) matching circuit which changes an operating band of the antenna to a frequency band where an RFID radio signal is input and output; a communication module which processes a mobile communication radio signal transmitted and received via the antenna; and a switch interposed between the antenna and the RFID matching circuit, the switch which connects the antenna to either the communication module or the RFID matching circuit according to whether an RFID function is used or not.

The mobile terminal may further include a communication matching circuit which is disposed between the antenna and the communication module wherein the communication matching circuit matches the operating band of the antenna to a frequency band of the mobile communication radio signal.

The communication matching circuit may be connected with the RFID matching circuit in parallel.

The switch may be disposed among the antenna, the communication matching circuit, and the RFID matching circuit, and the switch may be selectively connected to either the communication matching circuit or the RFID matching circuit.

When the switch is switched to connect the antenna and the RFID matching circuit, the operating band of the antenna may be matched to the frequency band of the RFID radio signal.

When the switch is switched to connect the antenna and the communication matching circuit, the operating band of the antenna may be matched to the frequency band of the mobile communication radio signal.

The RFID matching circuit may be connected to an end toward the communication module, of the communication matching circuit in parallel.

The switch may be interposed between the communication matching circuit and the RFID matching circuit to connect the communication matching circuit to either the communication module or the RFID matching circuit.

When the switch is switched to connect the communication matching circuit and the RFID matching circuit, the operating band of the antenna may be matched to the frequency band of the RFID radio signal.

When the switch is switched to connect the communication matching circuit and the communication module, the operating band of the antenna may be matched to the frequency band of the mobile communication radio signal.

The RFID matching circuit may include a capacitor $C_2$ connected to the switch in series; and a capacitor $C_3$ connected to the capacitor $C_2$.

The communication matching circuit may include an inductor $L_1$ connected to the switch in series; and a capacitor $C_1$ connected to the inductor $L_1$.

BRIEF DESCRIPTION OF THE DRAWING FIGURES

These and/or other aspects of the present invention will become more apparent and more readily appreciated from the following description of exemplary embodiments thereof, with reference to the accompanying drawings, in which.

DETAILED DESCRIPTION OF THE EXEMPLARY EMBODIMENTS

Certain exemplary embodiments of the present invention will now be described in greater detail with reference to the accompanying drawings.

The matters defined in the following description, such as detailed construction and element descriptions, are provided as examples to assist in a comprehensive understanding of the invention. Also, well-known functions or constructions are not described in detail, since they would obscure the invention in unnecessary detail.

Figure 1:
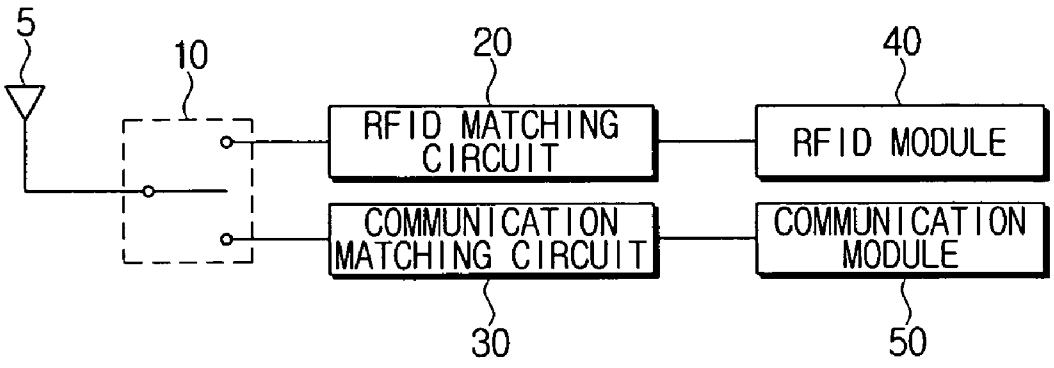
FIG. 1 is a block diagram of a mobile terminal according to one exemplary embodiment of the present invention.

FIG. 1 is a block diagram of a mobile terminal according to one exemplary embodiment of the present invention.

Referring first to FIG. 1, the mobile terminal includes an antenna 5, a switch 10, an RFID matching circuit 20, a communication matching circuit 30, an RFID module 40, and a communication module 50.

The mobile terminal has the single antenna 5. The mobile terminal has the communication matching circuit 30 and the RFID matching circuit 20, separately, so as to transmit and receive both a radio signal for mobile communications and a radio signal for the RFID via the single antenna 5.

Figure 2:
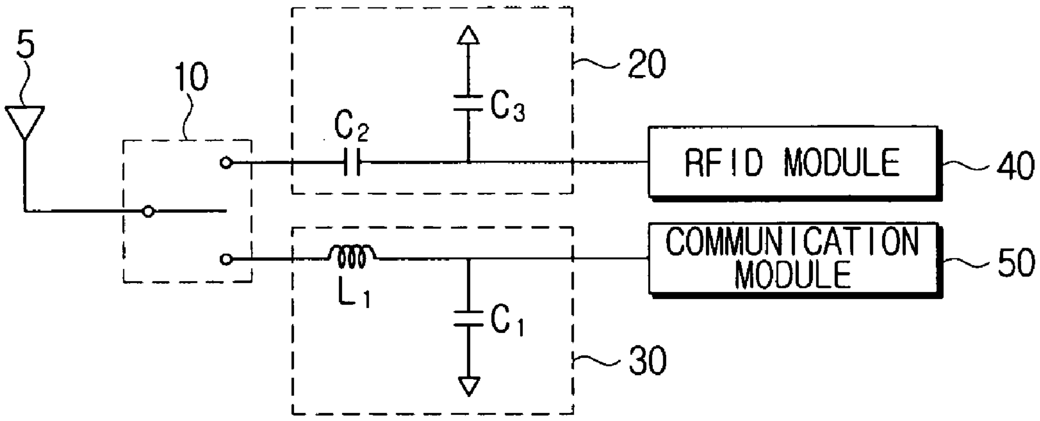
FIG. 2 is a simplified circuit diagram of the matching circuits of the mobile terminal of FIG. 1.

The communication matching circuit 30 regulates the operating band of the antenna 5 so that the operating band of the antenna 5 accurately matches a frequency band of the mobile communication radio signal. The communication matching circuit 30 can be implemented using various elements. In FIG. 2, the communication matching circuit 30 employs an LC circuit, by way of example. In one exemplary embodiment of the present invention, the communication matching circuit 30 includes an inductor $L_1$ connected with the antenna 5 in series, and a capacitor $C_1$ connected to the inductor $L_1$. Note that the capacity of the inductor $L_1$ and the capacitor $C_1$ varies according to the frequency band of the mobile communication radio signal.

Figure 3A:
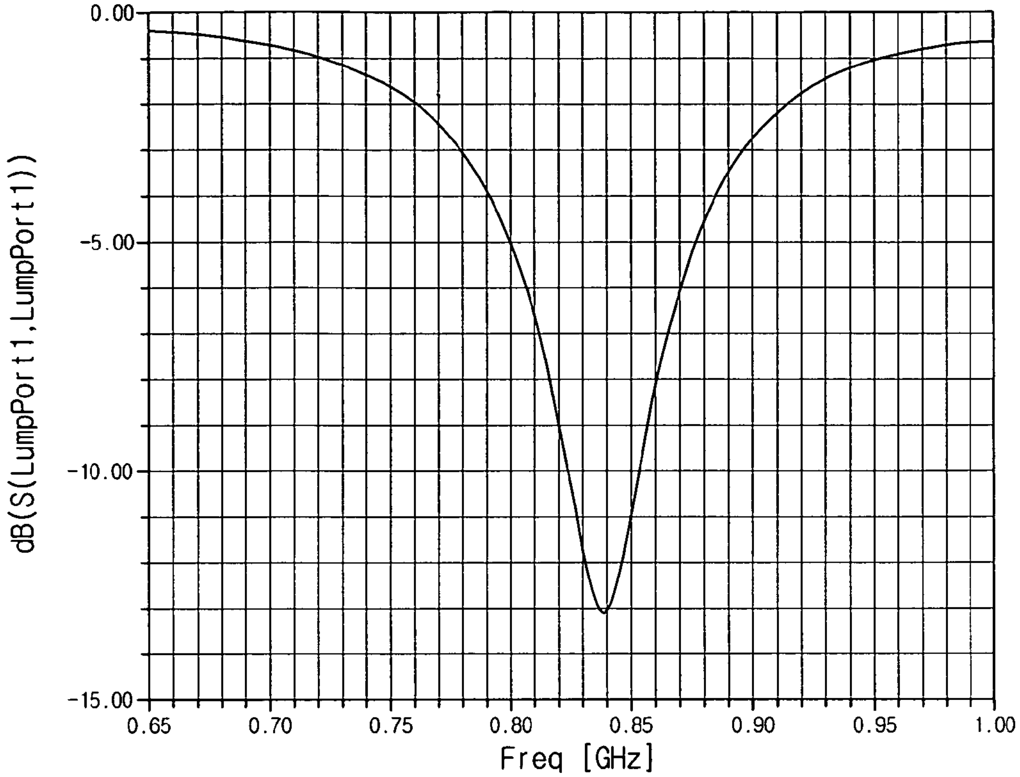
FIG. 3A is a S11 graph showing a simulation result of an operating band of the antenna when the communication matching circuit is not provided.
Figure 3B:
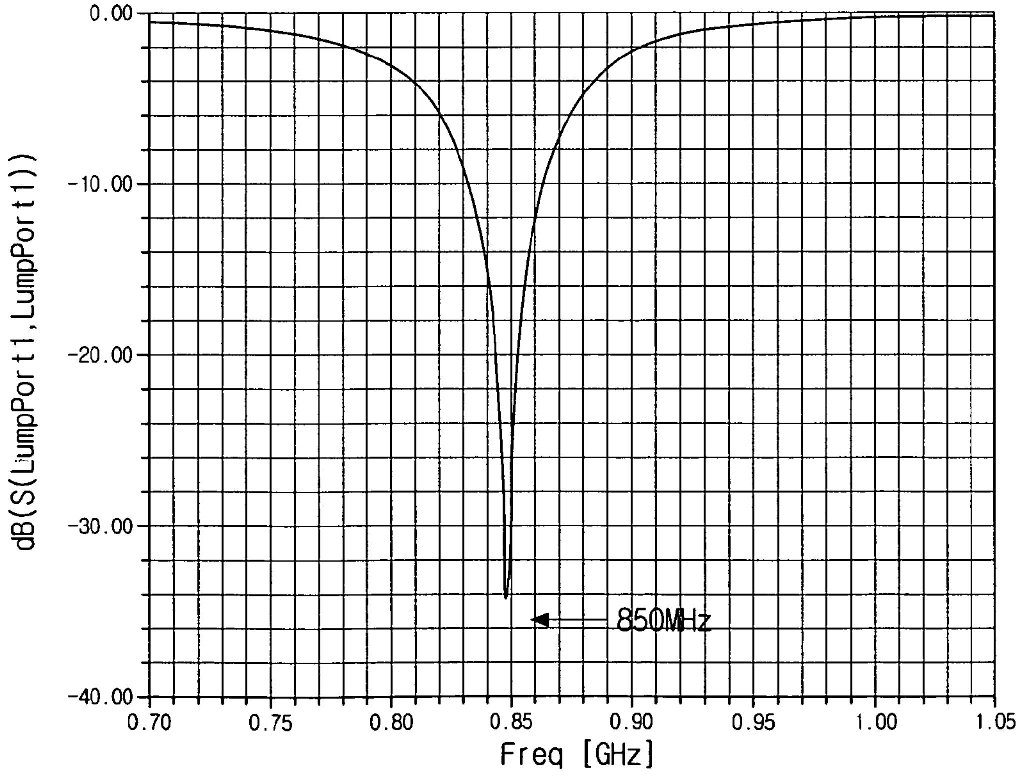
FIG. 3B is a S11 graph showing a simulation result of the operating band of the antenna when the communication matching circuit is provided.

FIG. 3A is a S11 graph showing a simulation result of the operating band of the antenna 5 when the communication matching circuit 30 is not provided, and FIG. 3B is a S11 graph showing a simulation result of the operating band of the antenna 5 when the communication matching circuit 30 is provided.

As shown in FIG. 3A, when the communication matching circuit 30 is not equipped, the operating band of the antenna 5 has a center frequency at about 840 MHz. At −10 dB, the bandwidth is 30 MHz.

By contrast, FIG. 3B depicts the operating band of the antenna 5 when the capacity of the inductor $L_1$ is set to 3.06 nH and the capacity of the capacitor $C_1$ is set to 2.86 pF in the communication matching circuit 30 of FIG. 2. As shown in FIG. 3B, the communication matching circuit 30 changes the center frequency of the operating band of the antenna 5 to 850 MHz. That is, when the communication matching circuit 30 is used, the operating band of the antenna 5 is shifted to the optimal frequency band.

Referring back to FIG. 2, the RFID matching circuit 20 includes a pair of capacitors $C_2$ and $C_3$ connected. The capacitor $C_2$ is connected with the antenna 5 in series, and the capacitor $C_3$ is connected with the capacitor $C_2$. As constructed above, the RFID matching circuit 20 allows the transmission and reception of the RFID radio signal by moving the operating band of the antenna 5 matched to the frequency band of the mobile communication radio signal, by a certain width. Note that the capacity of the capacitors $C_2$ and $C_3$ varies according to the frequency band of the RFID.

Figure 3C:
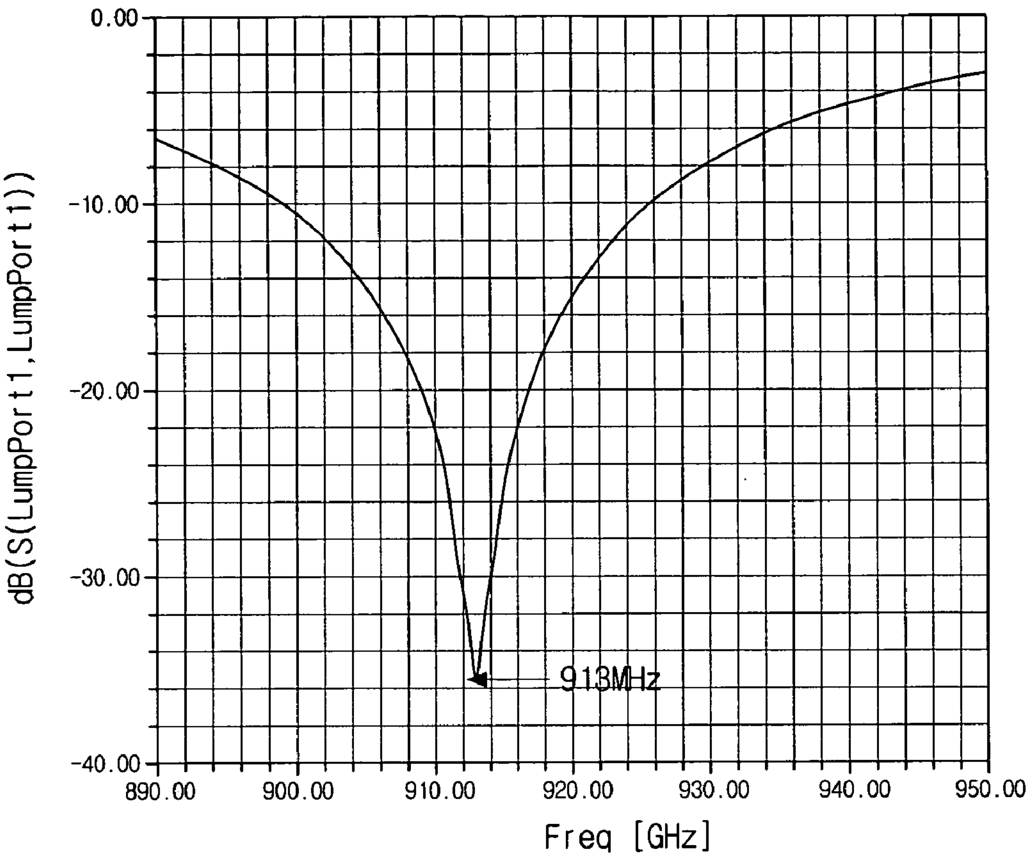
FIG. 3C is a S11 graph showing a simulation result of an operating band of the antenna when the RFID matching circuit is provided according to one exemplary embodiment of the present invention.

FIG. 3C is a graph showing a simulation result of the operating band of the antenna 5 when the RFID matching circuit 20 is used according to one exemplary embodiment of the present invention. The capacity of the capacitors $C_2$ and $C_3$ is set to 3.06 pF and 3.49 pF, respectively.

As shown in FIG. 3C, the frequency band of the antenna 5 is shifted to the RFID frequency band of 913 MHz.

Meanwhile, the switch 10 selectively switches one of the RFID matching circuit 20 and the communication matching circuit 30, is interposed among the antenna 5, the RFID matching circuit 20, and the communication matching circuit 30. When the switch 10 is connected with the RFID matching circuit 20, the RFID radio signal can be transmitted and received via the antenna 5. When the switch 10 is connected with the communication matching circuit 30, the communication radio signal can be transmitted and received via the antenna 5.

The RFID module 40 receives and processes a radio signal from an external electronic tag according to the operation of the RFID matching circuit 20, or outputs information relating to the electronic tag attached to the mobile terminal via the antenna 5.

The communication module 50 processes the mobile communication radio signal which is input and output via the antenna 5 when the communication matching circuit 30 operates.

Now, the transmission and the reception of the mobile communication radio signal and the RFID radio signal using the mobile terminal is described according to one exemplary embodiment of the present invention.

Usually, the mobile terminal is set to a mode for transmitting and receiving the mobile communication radio signal. In this mode, the switch 10 is switched to connect the antenna 5 and the communication matching circuit 30. The communication matching circuit 30 matches the operating band of the antenna 5 so that the mobile communication radio signal can be input and output via the antenna 5. The mobile communication radio signal transmitted and received through the antenna 5 is processed at the communication module 50.

In this state, when the user wants to use the RFID function, the user presses the RFID button provided to the mobile terminal, or brings the mobile terminal close to the electronic tag or the reader. Next, a controller (not shown) of the mobile terminal recognizes the selection of the RFID function and switches the switch 10 to connect the antenna 5 and the RFID matching circuit 20.

The RFID matching circuit 20 changes the operating band of the antenna 5 to the frequency band of the RFID radio signal. The RFID radio signal transmitted and received via the antenna 5 is processed at the RFID module 40.

Figure 4:
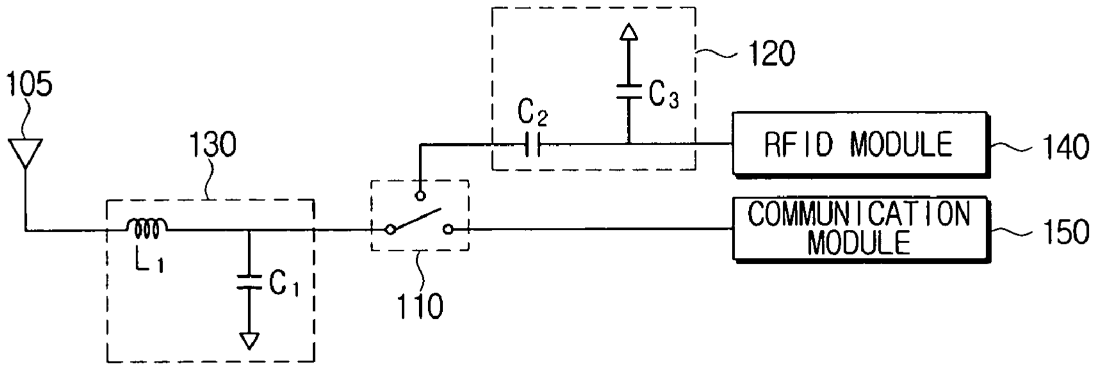
FIG. 4 is a block diagram of a mobile terminal according to another exemplary embodiment of the present invention.

FIG. 4 is a block diagram of a mobile terminal according to another exemplary embodiment of the present invention.

Referring to FIG. 4, the mobile terminal includes an antenna 105, a switch 110, an RFID matching circuit 120, a communication matching circuit 130, an RFID module 140, and a communication module 150, as in the one exemplary embodiment of the present invention. The mobile terminal according to the one exemplary embodiment is constructed such that the RFID matching circuit 20 and the communication matching circuit 30 are connected in parallel and when the switch 10 is adopted to selectively switch the RFID matching circuit 20 and the communication matching circuit 30.

By contrast, in the mobile terminal according to another exemplary embodiment, the communication matching circuit 130 and the RFID matching circuit 120 are arranged in sequence, and the RFID matching circuit 120 is connected to the end of the communication matching circuit 130 in parallel. The switch 110 is interposed between the communication matching circuit 130 and the RFID matching circuit 120. The switch 110 selectively switches to connect the communication matching circuit 130 to either the RFID matching circuit 120 or the communication module 150.

When the switch 110 switches to connect the communication matching circuit 130 and the RFID matching circuit 120, the operating band of the antenna 105 is matched to the frequency band of the mobile communication radio signal at the communication matching circuit 130 and then changed to the frequency band of the RFID radio signal at the RFID matching circuit 120. Consequently, the RFID radio signal can be transmitted and received through the antenna 105, and the RFID module 140 operates.

Meanwhile, when the switch 110 switches to connect the communication matching circuit 130 and the communication module 150, the operating band of the antenna 105 is matched to the frequency band of the mobile communication radio signal at the communication matching circuit 130. Thus, the mobile communication radio signal is transmitted and received through the antenna 105, and the communication module 150 operates In another exemplary embodiment the mobile terminal has the communication matching circuit 130 and the RFID matching circuit 120 constructed similar to the mobile terminal in one exemplary embodiment, and that the capacity of an inductor $L_1$ and a capacitor $C_1$ of the communication matching circuit 130, and the capacity of capacitors $C_2$ and $C_3$ of the RFID matching circuit 120 are different from those in one exemplary embodiment.

The transmission and reception of the mobile communication radio signal and the RFID radio signal using the mobile terminal is now described according to another exemplary embodiment of the present invention.

Usually, the switch 110 is switched to connect the communication matching circuit 130 and the communication module 150. The mobile communication radio signal is input and output via the antenna 105.

In doing so, when the user wants to use the RFID function, a controller (not shown) of the mobile terminal switches the switch 110 to connect the communication matching circuit 130 and the RFID matching circuit 120.

Accordingly, the operating band of the antenna 105 is matched to the frequency band of the mobile communication radio signal at the communication matching circuit 130 and then changed to the frequency band of the RFID radio signal at the RFID matching circuit 120.

As such, to allow the transmission and reception of the mobile communication radio signal and the RFID radio signal via the single antenna 5 or 105, the mobile terminal is equipped with the RFID matching circuit 20 or 120 to change the operating band of the antenna 5 or 105, which is matched to the frequency band of the mobile communication radio signal, to the frequency band of the RFID radio signal. Therefore, the mobile communication radio signal is usually transmitted and received, and the RFID radio signal is transmitted and received selectively.

Meanwhile, a mobile communication terminal usually requires a matching circuit so that antenna can operate at a desired operating frequency. As the recent improvements of antennas have enabled operation at a wide band frequency, a wideband antenna, which is able to operate not only at a frequency band of wireless mobile communication signal, but also at a frequency band of RFID signal, is possible. Such a wide band antenna, when developed, will not need separate RFID matching circuits 20, 120 as shown in FIG. 2 or FIG. 4 for transmission and reception of RFID signals, but simply utilize the existing matching circuit. That is, the existing matching circuit can be utilized to operate as the RFID matching circuit as exemplified in FIG. 1.

As set forth above, without having to provide the mobile communication antenna and the RFID antenna separately as in the related art, the compactness of the mobile terminal can be realized by use of a single antenna. Furthermore, since the RFID matching circuit is used to more accurately match the operating band of the antenna to the frequency band of the RFID radio signal, the RFID communications can be improved.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A mobile terminal comprising:

an antenna which transmits and receives a mobile communication radio signal;

a radio frequency identification (RFID) module for processing the RFID radio signals from external RFID devices;

an RFID matching circuit connected to the RFID module which changes an operating band of the antenna to a frequency band where an RFID radio signal is input and output;

a communication module which processes the mobile communication radio signal transmitted and received via the antenna; and a switch which connects the antenna to either the communication module or the RFID matching circuit according to whether an RFID function is used or not.

2. The mobile terminal as in claim 1, further comprising:

a communication matching circuit which matches the operating band of the antenna to a frequency band of the mobile communication radio signal.

3. The mobile terminal as in claim 2, wherein the communication matching circuit is connected with the RFID matching circuit in parallel.

4. The mobile terminal as in claim 2, wherein the switch selectively connects the antenna with either the communication matching circuit or the RFID matching circuit.

5. The mobile terminal as in claim 4, wherein, when the switch is switched to connect the antenna and the RFID matching circuit, the operating band of the antenna is matched to the frequency band of the RFID radio signal.

6. The mobile terminal as in claim 2, wherein, when the switch is switched to connect the antenna and the communication matching circuit, the operating band of the antenna is matched to the frequency band of the mobile communication radio signal.

7. The mobile terminal as in claim 2, wherein the RFID matching circuit is connected to an end of the communication matching circuit which directs the communication module, in parallel.

8. The mobile terminal as in claim 7, wherein the switch connects the communication matching circuit to either the communication module or the RFID matching circuit.

9. The mobile terminal as in claim 8, wherein, when the switch is switched to connect the communication matching circuit and the RFID matching circuit, the operating band of the antenna is matched to the frequency band of the RFID radio signal.

10. The mobile terminal as in claim 8, wherein, when the switch is switched to connect the communication matching circuit and the communication module, the operating band of the antenna is matched to the frequency band of the mobile communication radio signal.

11. The mobile terminal as in claim 1, wherein the RFID matching circuit comprises:

a first capacitor connected to the switch in series; and a second capacitor connected to the first capacitor.

12. The mobile terminal as in claim 2, wherein the communication matching circuit comprises:

a first inductor connected to the switch in series; and a first capacitor connected to the first inductor.

13. The mobile terminal as in claim 2, wherein the RFID matching circuit is a circuit to match operating frequency of the antenna.

* * * * *